US007313595B2

(12) United States Patent
Rust

(10) Patent No.: US 7,313,595 B2
(45) Date of Patent: *Dec. 25, 2007

(54) SYSTEM AND METHOD FOR RECORD AND PLAYBACK OF COLLABORATIVE WEB BROWSING SESSION

(75) Inventor: David Bradley Rust, San Diego, CA (US)

(73) Assignee: InterCall, Inc., Omaha, NE (US)

( * ) Notice: Subject to any disclaimer, the term of this patent is extended or adjusted under 35 U.S.C. 154(b) by 914 days.

This patent is subject to a terminal disclaimer.

(21) Appl. No.: 10/392,293

(22) Filed: Mar. 18, 2003

(65) Prior Publication Data
US 2004/0054728 A1   Mar. 18, 2004

Related U.S. Application Data

(63) Continuation of application No. 09/442,518, filed on Nov. 18, 1999, now Pat. No. 6,535,909.

(51) Int. Cl.
*G06F 15/16* (2006.01)
(52) U.S. Cl. .................. 709/204; 709/203; 709/217
(58) Field of Classification Search ........ 709/200–205, 709/217–227
See application file for complete search history.

(56) References Cited

U.S. PATENT DOCUMENTS

| | | | |
|---|---|---|---|
| 4,962,463 A * | 10/1990 | Crossno et al. ........ | 715/500.1 |
| 5,148,429 A | 9/1992 | Kudo et al. | |
| 5,359,598 A | 10/1994 | Steagall et al. | |
| 5,440,699 A | 8/1995 | Farrand et al. | |
| 5,483,587 A | 1/1996 | Hogan et al. | |

(Continued)

FOREIGN PATENT DOCUMENTS

DE   19717167 A1   10/1998

(Continued)

OTHER PUBLICATIONS

Multimedia consultation session recording and playback using Java-based browser in global PACS by Shah et al., Feb. 1998, SPIE-Int.*

(Continued)

*Primary Examiner*—Moustafa Meky

(57) ABSTRACT

A collaborative Web browsing session may take place over a network, allowing the presenter on a first computer to direct the audio and visual components of a browser on one or more second computers. The second computer is instructed to log into a control site that downloads an active control, such as an applet, to the second computer. The present invention allows a collaborative Web browsing session ("session"), as created by the presenter and witnesses by one or more users on second computers, to be recorded and archived by the control site. When a user of a computer is connected to the control site through a communication network such as the World Wide Web, that user may log into the control site and request to view an archived session. The session will then be replayed by the control site on the user's computer, directing the audio and visual components of the browser on the user's computer as if the user was attending the live session. The recorded session replays the events of the live session in real time such that they playback experience contains the same audio and visual events that took place when the session was originally being recorded.

8 Claims, 7 Drawing Sheets

U.S. PATENT DOCUMENTS

| | | | |
|---|---|---|---|
| 5,483,588 A | 1/1996 | Eaton et al. | |
| 5,530,795 A | 6/1996 | Wan | |
| 5,550,965 A * | 8/1996 | Gabbe et al. | 715/512 |
| 5,559,875 A | 9/1996 | Bieselin et al. | |
| 5,583,993 A | 12/1996 | Foster et al. | |
| 5,608,426 A | 3/1997 | Hester | |
| 5,608,872 A | 3/1997 | Schwartz et al. | |
| 5,617,423 A | 4/1997 | Li et al. | |
| 5,619,554 A | 4/1997 | Hogan et al. | |
| 5,619,555 A | 4/1997 | Fenton et al. | |
| 5,623,603 A | 4/1997 | Jiang et al. | |
| 5,634,018 A | 5/1997 | Tanikoshi et al. | |
| 5,649,104 A | 7/1997 | Carleton et al. | |
| 5,668,863 A * | 9/1997 | Bieselin et al. | |
| 5,706,502 A | 1/1998 | Foley et al. | |
| 5,734,871 A * | 3/1998 | Kleinerman et al. | 719/320 |
| 5,742,670 A | 4/1998 | Bennett | |
| 5,745,711 A | 4/1998 | Kitabara et al. | |
| 5,748,898 A | 5/1998 | Ueda | |
| 5,754,830 A | 5/1998 | Butts et al. | |
| 5,761,419 A | 6/1998 | Schwartz et al. | |
| 5,764,901 A | 6/1998 | Skarbo et al. | |
| 5,778,368 A | 7/1998 | Hogan et al. | |
| 5,781,909 A | 7/1998 | Logan et al. | |
| 5,786,814 A * | 7/1998 | Moran et al. | |
| 5,790,637 A | 8/1998 | Johnson et al. | |
| 5,809,247 A | 9/1998 | Richardson et al. | |
| 5,809,250 A | 9/1998 | Kisor | |
| 5,812,652 A | 9/1998 | Jodoin et al. | |
| 5,819,243 A * | 10/1998 | Rich et al. | |
| 5,844,979 A | 12/1998 | Raniere et al. | |
| 5,859,974 A | 1/1999 | McArdle et al. | |
| 5,894,556 A | 4/1999 | Grimm et al. | |
| 5,907,324 A | 5/1999 | Larson et al. | |
| 5,916,302 A * | 6/1999 | Dunn et al. | 709/204 |
| 5,930,238 A | 7/1999 | Nguyen | |
| 5,930,473 A | 7/1999 | Teng et al. | |
| 5,933,417 A | 8/1999 | Rottoo | |
| 5,940,082 A * | 8/1999 | Brinegar et al. | |
| 5,944,791 A | 8/1999 | Scherpbier | |
| 5,953,506 A | 9/1999 | Kalra et al. | |
| 5,963,547 A | 10/1999 | O'Neil et al. | |
| 5,978,756 A | 11/1999 | Walker et al. | |
| 5,978,835 A * | 11/1999 | Ludwig et al. | 709/204 |
| 5,986,655 A * | 11/1999 | Chiu et al. | |
| 5,990,933 A | 11/1999 | Ozone et al. | |
| 5,991,276 A | 11/1999 | Yamamoto | |
| 5,991,796 A * | 11/1999 | Anupam et al. | |
| 5,995,606 A | 11/1999 | Civanler et al. | |
| 5,995,608 A | 11/1999 | Detampel, Jr. et al. | |
| 5,995,951 A | 11/1999 | Ferguson | |
| 6,018,360 A | 1/2000 | Stewart et al. | |
| 6,018,774 A | 1/2000 | Mayle et al. | |
| 6,029,127 A | 2/2000 | Delargy et al. | |
| 6,049,602 A | 4/2000 | Foladare et al. | |
| 6,061,440 A | 5/2000 | Delaney et al. | |
| 6,061,717 A | 5/2000 | Carleton et al. | |
| 6,061,732 A | 5/2000 | Korst et al. | |
| 6,072,463 A | 6/2000 | Glaser | |
| 6,100,882 A | 8/2000 | Sharman et al. | |
| 6,151,621 A | 11/2000 | Colyer et al. | |
| 6,157,401 A | 12/2000 | Wiryaman | |
| 6,181,786 B1 | 1/2001 | Detampel, Jr. et al. | |
| 6,192,394 B1 | 2/2001 | Gutfreund et al. | |
| 6,237,025 B1 | 5/2001 | Ludwig et al. | |
| 6,240,444 B1 | 5/2001 | Fin et al. | |
| 6,246,771 B1 * | 6/2001 | Stanton et al. | 380/286 |
| 6,259,701 B1 * | 7/2001 | Shur et al. | 370/401 |
| 6,263,365 B1 | 7/2001 | Scherpbier et al. | |
| 6,295,551 B1 | 9/2001 | Roberts et al. | |
| 6,301,258 B1 | 10/2001 | Katseff | |
| 6,310,941 B1 | 10/2001 | Crutcher et al. | |
| 6,335,927 B1 | 1/2002 | Elliott et al. | |
| 6,343,313 B1 | 1/2002 | Salesky et al. | |
| 6,381,568 B1 | 4/2002 | Supplee et al. | |
| 6,411,988 B1 | 6/2002 | Tafaya et al. | |
| 6,418,471 B1 * | 7/2002 | Shelton et al. | 709/227 |
| 6,463,038 B1 | 10/2002 | Wilson | |
| 6,477,176 B1 | 11/2002 | Hamalainen et al. | |
| 6,535,909 B1 * | 3/2003 | Rust | 709/204 |
| 6,542,936 B1 | 4/2003 | Mayle et al. | |
| 6,598,074 B1 | 7/2003 | Maller et al. | |
| 6,665,835 B1 * | 12/2003 | Gutfreund et al. | 715/500.1 |
| 6,728,784 B1 | 4/2004 | Mattaway | |
| 6,785,244 B2 | 8/2004 | Roy | |
| 7,051,272 B1 * | 5/2006 | Ten Kate | 715/501.1 |
| 2003/0055899 A1 | 3/2003 | Burger et al. | |
| 2005/0144284 A1 * | 6/2005 | Ludwig et al. | 709/226 |

FOREIGN PATENT DOCUMENTS

| | | |
|---|---|---|
| EP | 0622931 A2 | 11/1994 |
| EP | 0779732 A2 | 6/1997 |
| EP | 0 874 323 | 10/1998 |
| EP | 0 874 323 A1 | 10/1998 |
| EP | 0874323 | 10/1998 |
| EP | 0874323 A1 | 10/1998 |
| EP | 0908824 A2 | 4/1999 |
| EP | 0 957 437 | 11/1999 |
| EP | 0 957 437 A2 | 11/1999 |
| EP | 0957437 A2 | 11/1999 |
| JP | 7049837 A | 2/1995 |
| JP | 11249995 A | 9/1999 |
| WO | WO 99/26153 A2 | 5/1999 |
| WO | WO 00/22802 A2 | 4/2000 |
| WO | WO 00/56050 A1 | 9/2000 |
| WO | WO 01/69418 A1 | 9/2001 |

OTHER PUBLICATIONS

Universal internet conference informatiuon system by Wahab et al.,Information Sciences v91, n1-2, May 1996.*

Interactive remote recording and playback of multicast videoconferencing, by Holfeder, W, Oct. 1998, Computer Communication Conference, vol. 21, No. 15, p. 1285-94.*

A multimedia system for asynchronous collaboration using the multicast backbone and the world wide web, by Vetter et al., IEEE Computer Soc., May 7-10, 1996.*

Holfeder, "Interactive Remote Recording and Playback of Multicast Videoconferencing," *Computer Communication Conference*, 21(15):1285-1294 (1998).

Jacobs, et al., "Filling HTML Forms Simultaneously: CoWeb—Architecture and Functionality," *Computer Networks and IDSN Systems*, 28(11):1385-1395 (1996).

Sastry, et al., "Webtour: A System to Record and Playback Dynamic Multimedia Annotations on Web Document Content," *Proceedings of the International Conference*, 175-178 (1999).

Odlyzko, P., et al., "Variable Rate Block Encoding and Adaptive Latency Control for Packet Voice Communications," Motorola Technical Developments, Motorola Inc. pp. 23:48-55 (1994).

Universal Internet Conference Information System, H. Abdel-Wahab, I. Stoica, F. Sultan Informatics and Computer Science 1996.

Multimedia Consultation Session Recording and Playback Using Java-based Browser in Global PACS, R. Martinez, P. Shah, Y. Yu SPIE Conference on PACS Design and Evaluation vol. 3339 Feb. 1998.

Jacobs, S., et al., "Filling HTML Forms Simultaneously: CoWeb-Architecture and Functionality," Computer Networks and ISDN Systems 28(11): 1385-1395 (1996).

Moralee D., "Scientific Graphics and Visualization Come to the Internet", Scientific Computing World, Mar. 1, 1995, p. 31, 33/34, 36 XP000571217 *p. 34, '2: The Internet carries videoconferencing MICE across Europe*.

Hao MC et al, "Collaborative Computing: A Multi-Client Multi-Server Environment", Conference on Organizational Computing Systems, Milpitas, CA, Aug. 123-16, 1995 Comstock N; Ellis C (EDS) pp. 206-213, XP000620968.

Proceedings of the Conference on Emerging Technologies and Applications vol. 1, 1996 pp. 60-63. Vetter, RJ; Junalacada, C. "A Multimedia System for Asynchronous Collaboration".

"Interactive Remote Recording and Playback of Multicast Video Conferences" W. Holfelder (1998).

Sastry, Chellury R. et al., "Web Tour: A System to Record and Playback Dynamic Multimedia Annotations on Web Document Control," Proceedings of the International Conference, Oct. 1999 pp. 175-178.

Paper entitled "Defendant and Counterclaimant WebEx Communications, Inc.'s Preliminary Invalidity Contentions" filed in *Raindance Communications, Inc. v. WebEx Communications, Inc. and WebEx Communications, Inc. v. Raindance Communications, Inc.*, Civil Action No. 6:05 CV 375 LED on Jan. 24, 2006.

Paper entitled "Defendant and Counterclaimant WebEx Communications, Inc.'s Amended Preliminary Invalidity Contentions" filed in *Raindance Communications, Inc. v. WebEx Communications, Inc. and WebEx Communications, Inc. v. Raindance Communications, Inc.*, Civil Action No. 6:05 CV 375 LED on Jan. 24, 2006.

Paper entitled "Complaint for Patent Infringement of United States Patent Nos. 6,535,909 and 6,621,834" filed in *Raindance Communications, Inc. v. WebEx Communications, Inc. and WebEx Communications, Inc. v. Raindance Communications, Inc.*, Civil Action No. 6:05 CV 375 LED on Oct. 14, 2005.

Paper entitled "Defendant WebEx Communications, Inc.'s Answer to Plaintiff Raindance Communications, Inc.'s Complaint, Counterclaims and Jury Demand" filed in *Raindance Communications, Inc. v. WebEx Communications, Inc. and WebEx Communications, Inc. v. Raindance Communications, Inc.*, Civil Action No. 6:05 CV 375 LED on Nov. 3, 2005.

Paper entitled "Plaintiff Raindance Communications, Inc.'s Reply to Defendant WebEx Communications, Inc's Answer, Counterclaims and Jury Demand" filed in *Raindance Communications, Inc. v. WebEx Communications, Inc. and WebEx Communications, Inc. v. Raindance Communications, Inc.*, Civil Action No. 6:05 CV 375 LED on Nov. 23, 2005.

Paper entitled "Raindance Communications, Inc.'s Initial Disclosures" filed in *Raindance Communications, Inc. v. WebEx Communications, Inc. and WebEx Communications, Inc. v. Raindance Communications, Inc.*, Civil Action No. 6:05 CV 375 LED on Jan. 13, 2006.

Paper entitled "Plaintiff and Counterdefendant Raindance Communications, Inc.'s Additional Disclosures" filed in *Raindance Communications, Inc. v. WebEx Communications, Inc. and WebEx Communications, Inc. v. Raindance Communications, Inc.*, Civil Action No. 6:05 CV 375 LED on Jan. 30, 2006.

Shah, et al., "Multimedia Consultation Session Recording and Playback Using Java-Based Browser in Global PACS," *SPIE-Int*, Feb. 1998.

Vetter, et al., "A Multimedia System for Asynchronous Collaboration Using the Multicast Backbone and the World Wide Web," *IEEE Computer Soc.*, 7-10 (1996).

WAHAB, et al., "Universal Internet Conference Information System," *Information Sciences*, 91(1-2): (1996).

Sastry, Chellury R. et al., "Webtour: A System To Record And Playback Dynamic Multimedia Annotations On Web Document Content," *Proceedings of the International Conference*, Oct. 1999, pp. 175-178, ACM Multimedia, New York, NY.

Jacobs, Stephan, et al., "Filling HTML forms simultaneously: CoWeb—architecture and functionality," *Computer Networks and ISDN Systems*, May 1996, pp. 1385-1395, vol. 28, No. 11, Holland Publishing, Amsterdam, Netherlands.

\* cited by examiner

SYSTEM AND METHOD FOR RECORD AND PLAYBACK OF COLLABORATIVE WEB BROWSING SESSION

RELATED APPLICATIONS

This application is a continuation application of U.S. Ser. No. 09/442,518, filed Nov. 18, 1999, which will issue as U.S. Pat. No. 6,535,909. The entire disclosure of application Ser. No. 09/442,518 is incorporated by reference herein.

BACKGROUND OF THE INVENTION

1. Field of the Invention

The present invention relates generally to a system and method for browsing computer networks such as the World Wide Web ("Web"). More specifically, the present invention relates to a system and method for recording a collaborative Web browsing session and the replay of a, collaborative Web browsing session on the display of a computer connected to a server through a network.

2. Related Art

The Internet is comprised of a vast number of world-wide interconnected computers and computer networks. These interconnected computers exchange information using various services such as electronic mail ("email"), Gopher, telnet, file transfer protocol ("FTP"), and the Web. The Web allows a computer that is connected to the Internet to access data that is stored on other interconnected computers. The data available on these interconnected computers is divided up into segments that are colloquially referred to as "Web pages." The data collected together on a Web page is not restricted to a textual format. The data can be graphical, audio, moving picture, or any other compatible multi-media source. Users gain access to Web pages by using an application program known as a "browser". Thus, an individual using a computer connected to the Internet can browse through various Web pages existing on computers around the world.

The ubiquitous nature of the Internet facilitates its use as a business tool. Accordingly, many Web pages are devoted to providing product marketing information and taking sales orders. Additionally, the Web can be used as a communication tool between a sales representative and a potential customer. For example, a collaborative Web browsing system can be used to allow a sales person to guide a potential customer through a predetermined set of Web pages that comprise a sales presentation. This is accomplished by allowing the sales person to control the potential customer's Web browser. Such a system is disclosed in U.S. Pat. No. 5,944,791 ("the '791 patent"), which is hereby incorporated by reference in its entirety.

The '791 patent provides a collaborative Web browsing system and method for allowing a first computer connected to the Web to cause the browsers of one or more second computers simultaneously connected to the Web to display certain predetermined Web pages or presentation slides as directed by the first computer. The problem is that often it is desirable for the user of the first computer ("Presenter") to be able to record and save the presentation so that the one or more second computers ("Client") can view the presentation at a later time.

For example, if a sales person scheduled a collaborative Web browsing session in order to show additional products that complement existing products, any customer that was unable to attend would miss the presentation. In order for the sales person to present the additional products to the absent customers, the sales person would have to schedule and present another collaborative Web browsing session.

Another example of this problem arises when the potential customers are unknown at the time of the collaborative Web browsing session. In this case, once the sales person ascertains who the potential customers are, additional time and resources are required for the sales person to present the session a second time. Furthermore, the potential exists for the sales person to have to present the collaborative Web browsing session a third and possibly more times.

Yet another example of this problem arises when the collaborative Web browsing session presents critical information. In such a case, an attendee may need to experience the presentation again in order to absorb the dense content. Furthermore, someone who was unable to attend may need to experience the presentation in order to get up to speed with the critical information. Unfortunately, if the presenter is no longer available, it is likely that the individual in later need of the presentation will be unable to view the presentation.

Therefore, the problem is that a collaborative Web browsing session cannot be viewed after the initial live interactive session. Furthermore, there is no way to allow a collaborative Web browsing session to be reviewed at a later time. Accordingly, it is an object of the present invention to address these problems inherent in a collaborative Web browsing session.

SUMMARY OF THE INVENTION

As recognized by the present invention, it is desirable for the Presenter in a collaborative Web browsing session to be able to record the presentation for playback at a later time. Additionally, it is desirable for all of the elements of the presentation to be recorded including audio, predetermined slides and web pages, and dynamically integrated regions of the Presenter's display. An example of a method to dynamically integrate a region of the Presenter's display is found in the above-referenced AppView Patent application. This would allow a sales presentation to be viewed by an absentee customer. It would also allow a presentation to be viewed by a future customer who was not known at the time of the presentation. Additionally, it would allow any other person, who attended the live presentation or not, to replay the collaborative Web browsing session for edification or business purposes. Thus, as recognized by the present invention, it is possible to provide a data structure on a computer readable medium that enables the replay of a previously recorded collaborative Web browsing session.

Accordingly, it is an advantage of the present invention to provide a data structure on computer readable medium that records the events of a collaborative Web browsing session, thus allowing the later reply of the previously recorded collaborative Web browsing session. Another feature of the present invention is to provide a data structure on a computer readable medium that can playback a previously recorded collaborative Web browsing session with real time correlation between the recorded audio and visual events. Yet another benefit of the present invention is to provide an easy-to-use and cost effective system and method for a first computer to cause a second computer to display images and play sounds recorded at a previous time by the first computer. Still another advantage of the present invention is to provide a data structure on a computer readable medium that can archive the audio and visual data events in a real time collaborative Web browsing session and allow access to that data such that the archives can be replayed at a later time.

A computer program product includes a program means stored on a computer readable medium that is readable by a digital processing system. As intended by the present invention, the computer program product is realized in a machine component that causes the digital processing system to perform method steps to enable a first computer to direct the browser of one or more second computers. As further intended by the present invention, the computer program product is realized in a machine component that causes a control site computer to record and archive a collaborative Web browsing session. Stated differently, a machine component establishes a computer program product for performing method steps to enable a control site computer to record the audio and visual components of a collaborative Web browsing session and archive that data as a session that is available for playback at a later time.

As disclosed in detail below, the present computer performable instructions include notifying the control site computer to begin recording the session, sending the session data to the control site computer in audio and visual data format, storing the audio and visual data on the control site computer, notifying the control site computer to stop recording the session, and merging the audio and visual data together on the control site computer. In a preferred embodiment, the data merged together into one playback file is made available on the control site computer for later viewing. The computer program product is also disclosed in combination with the digital processing apparatus, and in further combination with the computer network.

In another aspect, a computer-implemented method is disclosed for allowing a control site computer to record and archive the audio and visual components of a collaborative Web browsing session. The method includes notifying the control site computer to start recording. In alternative embodiments, and as disk space becomes more plentiful, each collaborative Web browsing session could be automatically recorded, thus eliminating this step. The method further includes sending the audio and visual data elements to the control site computer. In a preferred embodiment, this data is sent using the HTTP protocol over the Web. Additionally, the method includes storing the audio and visual data elements on the server and merging those elements together when the control site computer receives a stop recording notice. In an alternative embodiment, the control site computer could merge the audio and visual data elements as they are received, eliminating the need to merge the data upon completion of the session.

In still another aspect, a system is disclosed for allowing a control site computer to record an archive for later replay, the audio and visual components that comprise a collaborative Web browsing session. The system includes, at a first computer, logic means for notifying the control site computer to begin recording the session, and logic means for transmitting the audio and visual data components of the session. At the control site, logic means are provided for separately storing the audio and visual data elements and logic means for merging the audio and visual data into an archive file available for playback. Also at the control site, the system includes logic means for transmitting a replay of the session from the archive file to a second computer. At the second computer, the system includes logic means for requesting the playback of the archive file and logic means for displaying the visual data elements and playing the audio elements of the session.

DETAILED DESCRIPTION OF THE PREFERRED EMBODIMENTS FOR THE INVENTION

The present invention is directed toward a system and method for browsing computer networks such as the World Wide Web ("Web"). More specifically, the present invention relates to a system and method for recording a collaborative Web browsing session. Additionally, the present invention relates to the playback of a previously recorded collaborative Web browsing session on the monitor of a computer connected to a network, such as the Internet.

After reading this description it will become apparent to one of ordinary skill in the art how to implement the invention in alternative embodiments and alternative applications. As such, this detailed description of a preferred and alternative embodiments should not be construed to limit the scope of breadth of the present invention.

Figure 1A:
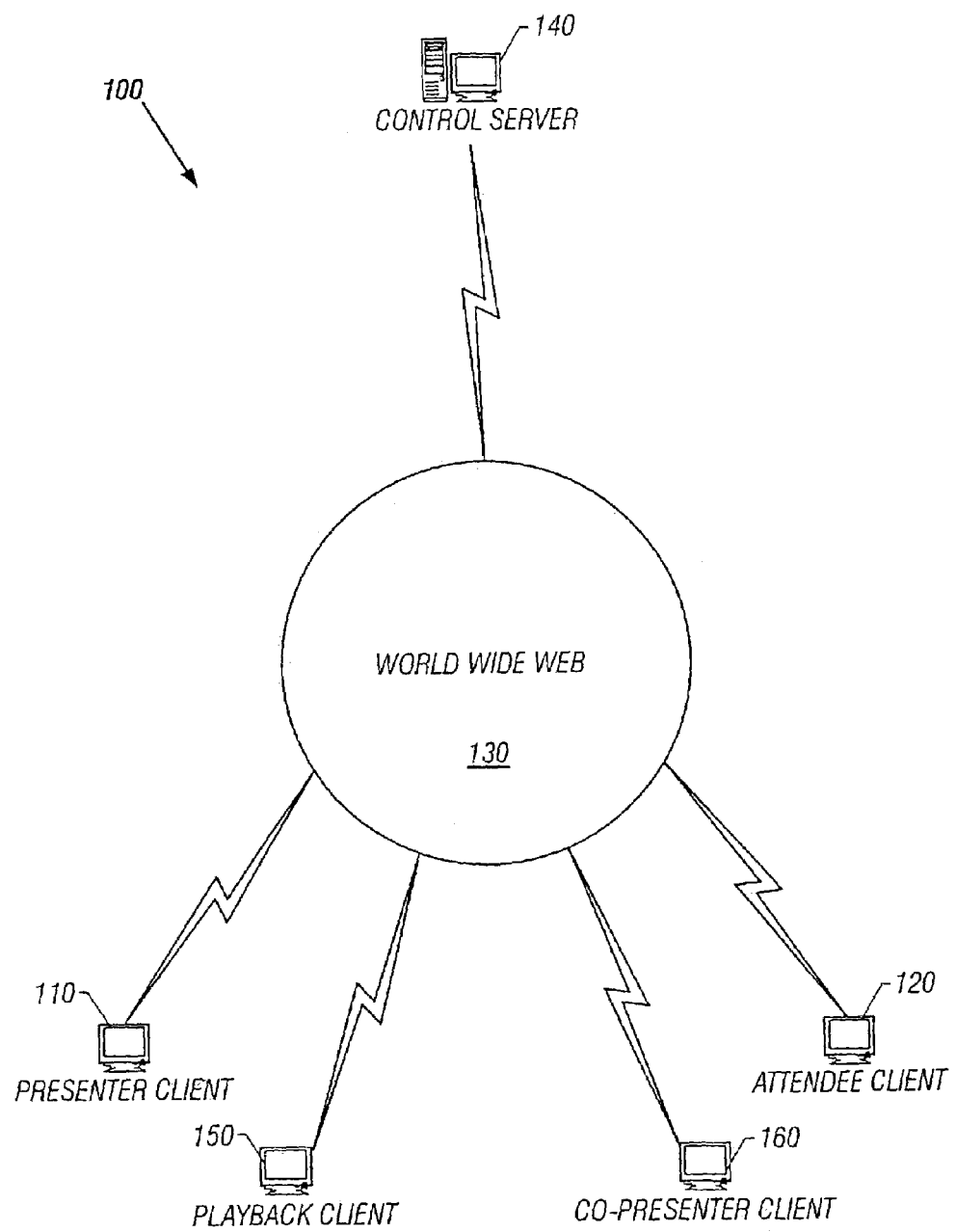
FIG. 1A is a block diagram depicting an operational environment according to one example of the present invention.
Figure 1B:
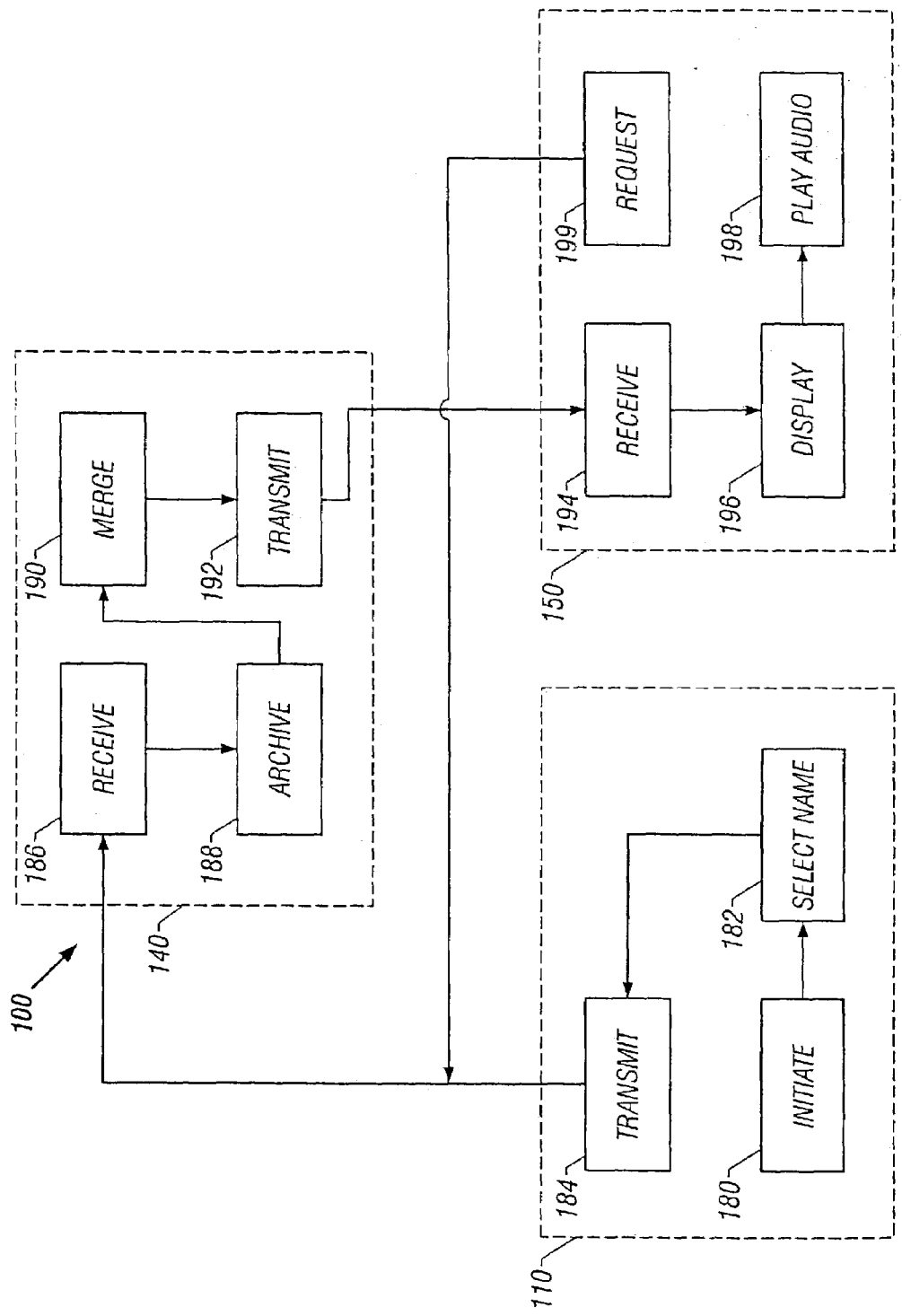
FIG. 1 is a functional diagram depicting an operational environment according to one embodiment of the present invention.
Figure 4:
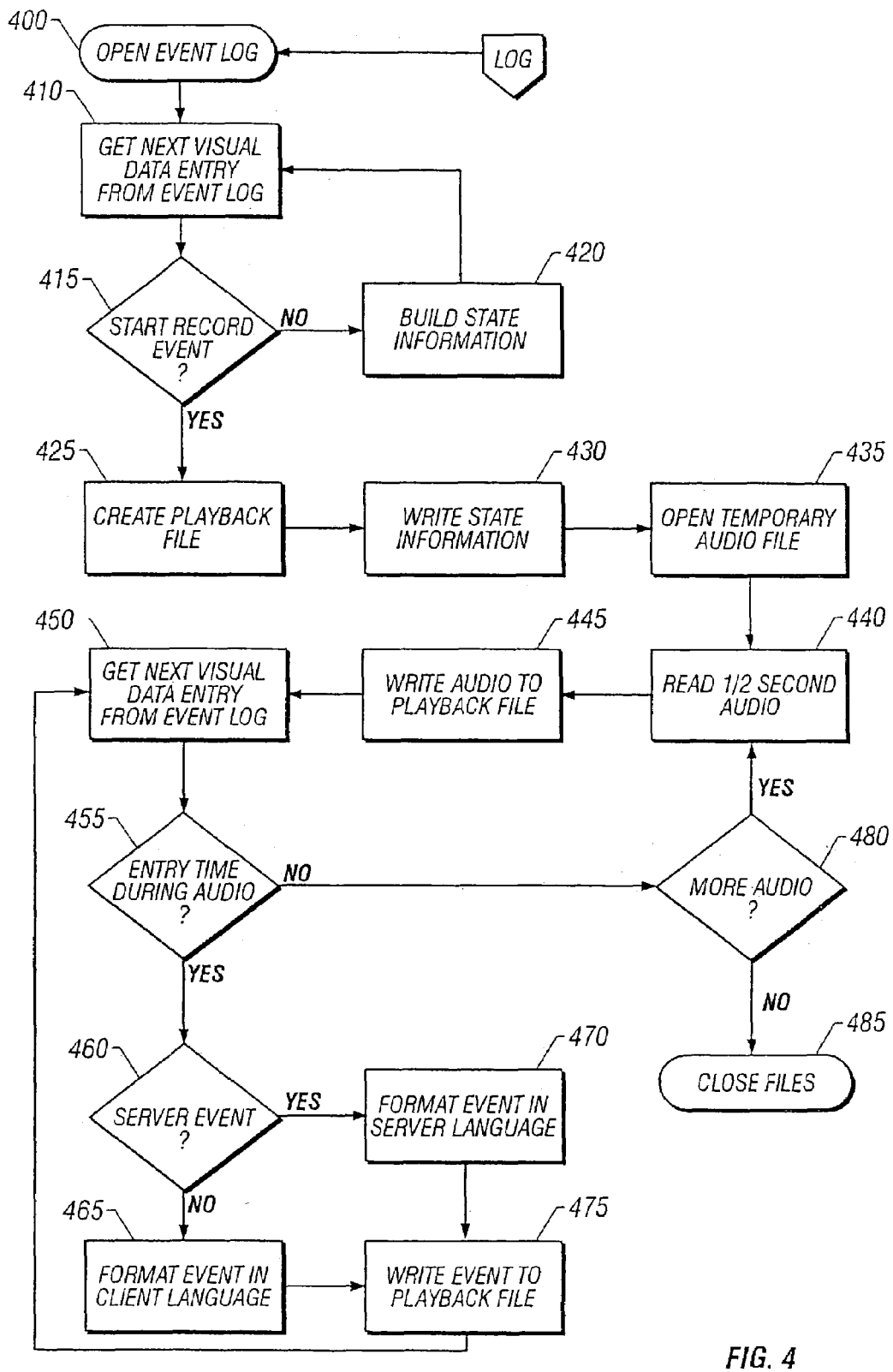
FIG. 4 is a flowchart depicting an example of a method that can be used by the Control Server to merge the audio and visual data elements of a recorded collaborative Web browsing session.
Figure 5:
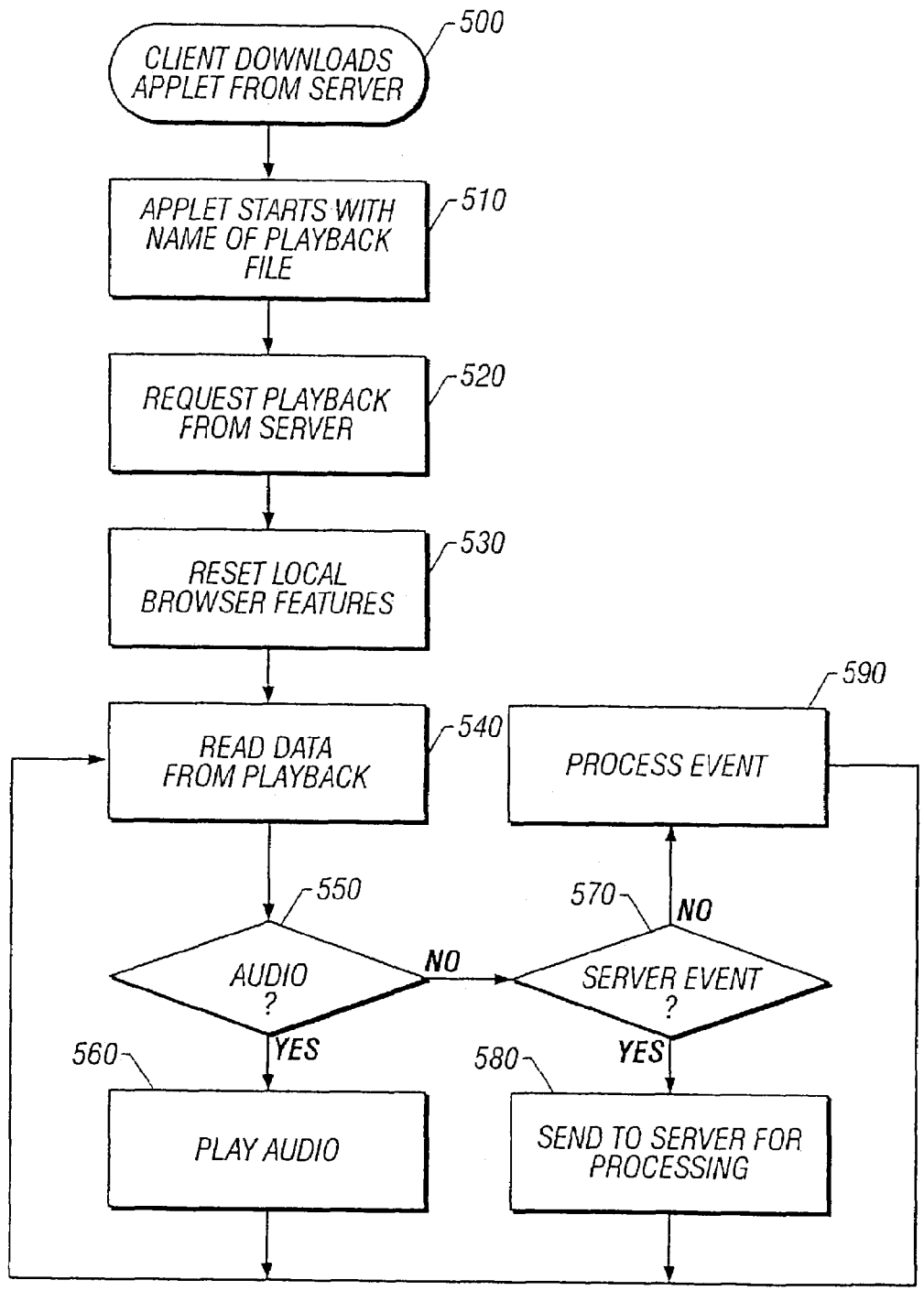
FIG. 5 is a flowchart depicting an example of a method that can be used by the Attendee Client to playback a previously recorded collaborative Web browsing session.
Figure 6:
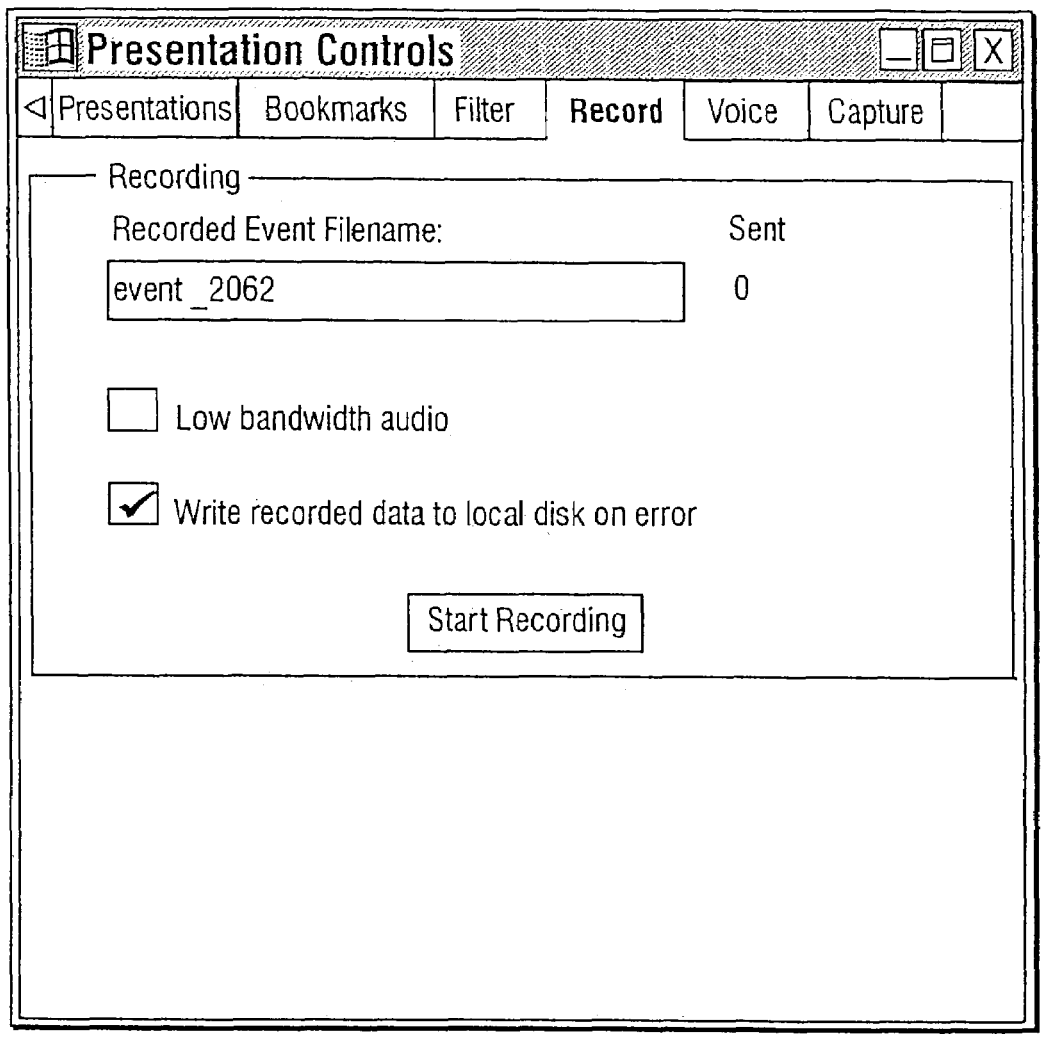
FIG. 6 depicts an example of a configuration window allowing the Presenter to set the name of the archive file and start recording the collaborative Web browsing session.

FIGS. 1 and 1A are diagrams that show example collaborative Web browsing sessions 100. FIGS. 2, 3, 4 and 5 are flowcharts that illustrate, as embodied in the present invention, the initialization of the recording process on the Presenter Client 110 computer, the storing of the audio and visual data elements on the Control Server 140, the merging of the audio and visual data into an archive file, and the playback of the session on the Playback Client 150. Additionally, FIG. 6 is an example of a control window which allows the Presenter Client 110 to initiate the recording of the collaborative Web browsing session 100. Those skilled in the art will appreciate that the Figures illustrate the structures of logic elements such as computer program code elements or logic circuits that function according to this invention. Manifestly, the invention is practiced in its essential embodiment by a machine component that renders the logic elements in a form that instructs a digital processing apparatus (a computer) to perform a sequence of function steps corresponding to those shown in the figures.

These instructions may reside on a program storage device including a data storage medium, such as a computer diskette, optical disk, compact disk ("CD"), or magnetic tape. Alternatively, such media can also be found in semiconductor devices, on a conventional hard disk drive, electronic read-only memory, electronic access memory, or on any other appropriate data storage device. In an illustrative embodiment of the invention, the logic means are computer executable instructions that are written in the Java programming language.

Referring initially to FIG. 1, a functional overview of the present invention is shown. A collaborative Web browsing session 100 is initiated between the Presenter Client 110 and the Attendee Client 120. In a preferred embodiment, this session is established over the Internet using the Web 130. The presenter Client 110 computer and the Attendee Client 120 computer can be any suitable computer such as a personal computer ("PC") or a laptop computer, each having a display, such as a video monitor or flat panel display for presentation. Also, the Web browsers used in the collaborative Web browsing session by the Presenter Client 110 and the Attendee Client 120 may advantageously be commercial browsers such as those made by Netscape and Microsoft. Futhermore, it should be noted that the World Wide Web is just one example of a computer network that can be used with the present invention. In alternative embodiments, other types of computer networks can be used, including LANs, WANs, intranets, etc. Accordingly, the use of the Web 130 as an exemplary Computer network used in the explanatory examples should not be construed to limit the scope or breadth of the present invention.

Referring back to FIG. 1, the collaborative Web browsing session 100 in this example embodiment is facilitated by the use of a Control Server 140, which includes a control module that enables the Presenter Client 110 to control the Web Browser of one or more Attendee Clients 120. Accordingly, the Presenter Client 110 has an active control associated with its Web browser. This active control is preferably a small application program referred to as an "applet." The applet running on the Presenter Client 110 allows the Present Client's 110 Web browser to communicate with the control module on the Control Server 140. This communication preferably takes place via a computer network, such as the Web 130.

Similarly, the one or more Attendee Clients 120 (only a single Attendee Client is shown in FIG. 1 for clarity), include an applet that allows the Attendee Client's Web browser to communicate with the control module on the Control Server 140. Preferably, the communication between the Presenter Client 110, the Control Server 140, and to the Attendee Client 120 takes place through a computer network, such as the Web 130. Thus, FIG. 1 depicts a collaborative Web browsing session in which the Presenter Client 110 and the Attendee Client 120 use an applet to communicate with the Control Server 140 over a network such as the Web 130.

Additionally represented in FIG. 1 is the Playback Client 150. The Playback Client 150 computer can also be any suitable computer such as a personal computer ("PC") or a laptop computer, each having a display, such as a video monitor or flat panel display for presentation. Moreover, the Web browser used by the Playback Client 150 may be any commercial browser, such as those made by Netscape and Microsoft. The Playback Client 150, in an example embodiment, is connected to the Control Server 140 through a network, such as the Web 130. In a preferred embodiment, the Playback Client 150 replays a collaborative Web browsing session 100 after it has been recorded. For example, when a collaborative Web browsing session is being broadcast over the Web, the Attendee Client 120 is contemporaneously participating in the session. Conversely, when the session is complete and the audio and visual events have been recorded, a Playback Client 150 may later desire to review the session. Thus, FIG. 1 additionally depicts an example of a Playback Client 150 viewing a previously recorded collaborative Web browsing session 100 over a network such as the Web 130.

FIG. 1A represents a block diagram of the recording and replay of a collaborative Web browsing session 100. In a preferred embodiment, the Presenter Client 110 has an Initiator 180 by which the Presenter Client 110 may begin recording the session. For example, the Present Client 110 may have a control window with a button that starts the recording of the session. Additionally, the Presenter Client 110 has a Selector 182 that allows the Presenter Client 110 to choose the name for the recorded session archive. For example, the Presenter Client 110 may have a control window with a field in which the Presenter Client 110 can type in the desired filename. An example of a control window with a button to start recording and an entry field for the desired recording file name is discussed below with reference to FIG. 6. Also in this example embodiment, the Presenter Client 110 has a Transmitter 184 that allows the Present Client 110 to send the audio and visual data elements of the collaborative Web browsing session to the Control Server 140.

Accordingly, the Control Server 140 has a Receiver 186 that receives the audio and visual data elements from the Presenter Client 110. In this example embodiment, the Control Server 140 also has an Archiver 188 that separately stores the audio and visual data elements that comprise the collaborative Web browsing session 100. In n alternative embodiment, the Archiver 188 may store the audio and visual data elements together in the same file. For example, in one embodiment, the audio and visual data elements are stored separately and then later merged into the archive file by the Merger 190 on the Control Server 140. Alternatively, the Archiver 188 may merge the audio and visual data together as its stores the data in the archive file.

In a preferred embodiment, the Receiver 186 on the Control Server 140 also receives requests from the Playback Client 150. For example, the Playback Client 150 is connected to the Control Server 150 via the Web and can send requests through its Requestor 199. The Playback Client 150 requests that the Control Server 140 replays a certain collaborative Web browsing session 100. The Playback Client 150 sends this request through its Requestor 199 and the Control Server 140 receives this request through its Receiver 186.

Continuing the example, once the Control Server 140 receives the request, the Transmitter 192 begins transmitting the contents of the archive file to the Playback Client 150. The Playback Client 150 has a corresponding Receiver 194 that receives the data from the archive file sent by the Control Server 140. When the data is received by the Playback Client 150, the data is processed by the Playback Client 150. Processing by the Playback Client 150 may alternatively require internal handling by the applet, displaying of visual data on the Playback Client 150 monitor by the Displayer 196, or channeling of audio data through Playback Client 150 speakers by the Player 198. Thus, in this example, the Playback Client 150 experiences the same audio and visual data elements of the collaborative Web browsing session 100 as did the Attendee Clients 120.

Figure 2:
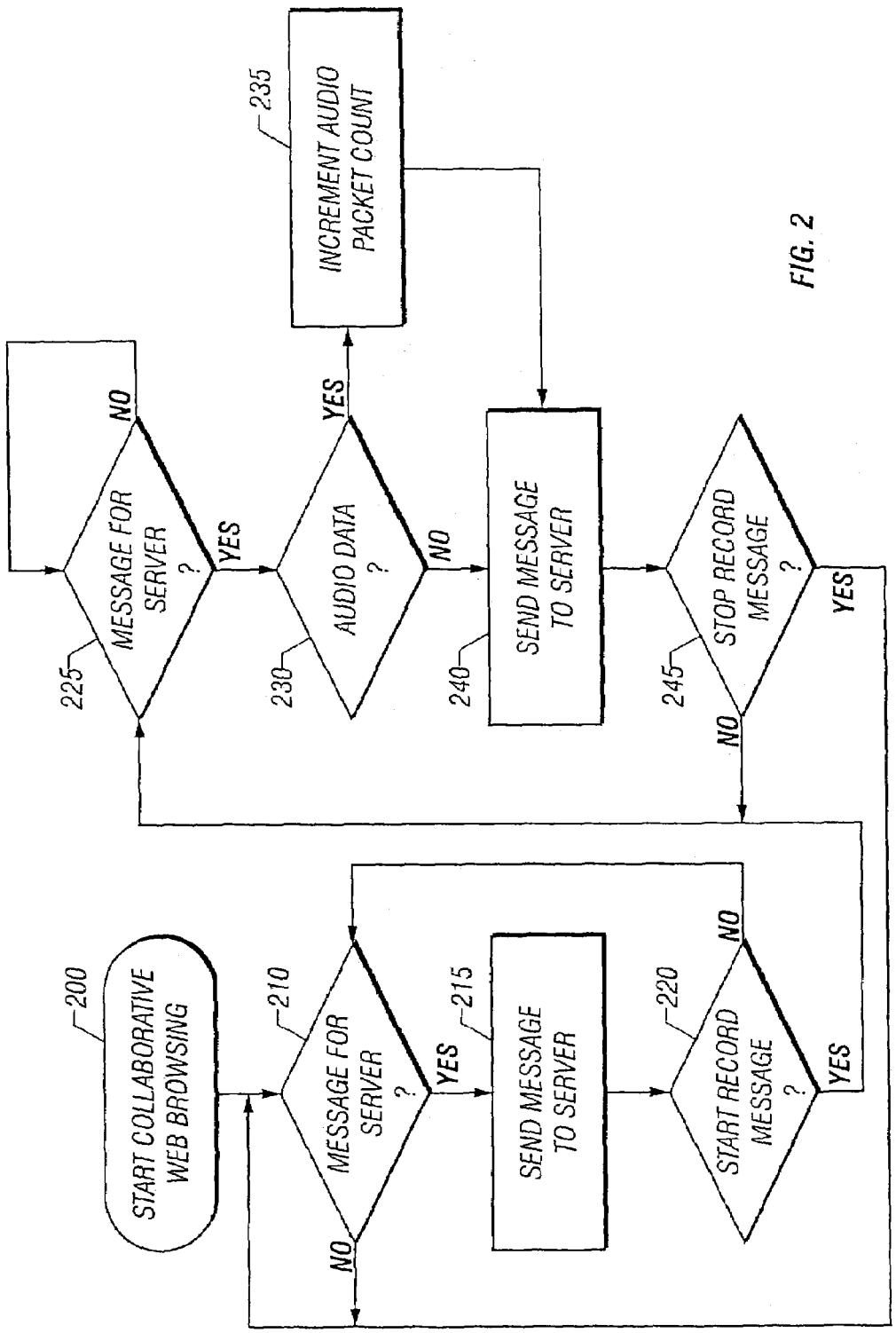
FIG. 2 is a flowchart depicting an example of a method that can be used by the Presenter to originate the audio and visual data events contained in a collaborative Web browsing session.

To start the recording of a collaborative Web browsing session 100, the Presenter Client 110, for example, initiates the recording process. FIG. 2 illustrates one example of an initialization process of the present invention. For example, after the collaborative Web browsing session 100 has commenced, as indicated by step 200, the Presenter Client 110 applet waits for messages to send to the Control Server 140. In a preferred embodiment, upon receipt of the message, the Presenter Client 110 sends the message to the Control Server 140, as illustrated in step 215. When the Presenter Client 110 receives the message, it preferably examines the message to determine if the message indicates to start the recording process, as shown, for example, in step 220.

In a preferred embodiment, after the recording of the collaborative Web browsing session 100 begins, the Presenter Client 110 applet continues to wait for messages to send to the Control Server 140, as indicated in step 225. For example, when recording, the Presenter Client examines the messages to be sent to the server. If the message represents an audio event, as illustrated in step 230, the Presenter Client 110 increments a counter to keep track of the number of audio messages sent to the Control Server 140, as illustrated in step 235. This allows the Control Server 140 to later verify receipt of the entire set of audio events contained in the collaborative Web browsing session 100.

Continuing the example, in step 240 the Presenter Client 110 sends the message to the Control Server 140, regardless of the message type. In a preferred embodiment, during the recording process, the Presenter Client 110 examines each message sent to the Control Server 140 to determine whether to stop recording, as illustrated in step 245.

Figure 3:
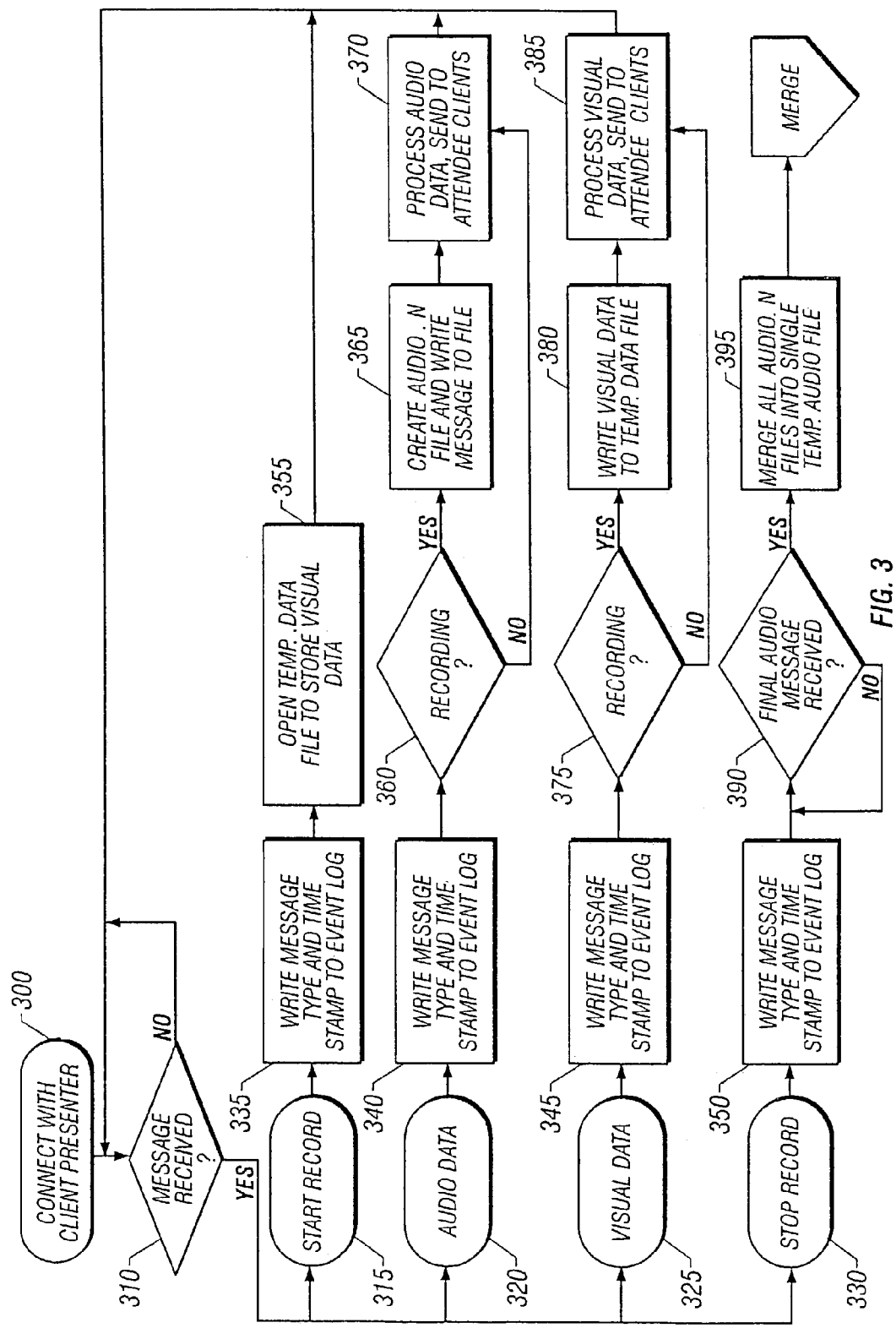
FIG. 3 is a flowchart depicting an example of a method that can be used by the Control Server to separate and record the audio and visual data elements of a collaborative Web browsing session 100.

When the recording process is initiated, the Control Server 140, in a preferred embodiment, begins storing the audio and visual data components of the collaborative Web browsing session 100. FIG. 3 is a flowchart that depicts an example of the actions that may take place on the Control Server 140 during the recording of a collaborative Web browsing session 100. In a preferred embodiment, the collaborative Web browsing session 100 has already commenced, as illustrated by step 300. For example, in step 310, the Control Server 140 waits for messages from the Presenter Client 110. When a message is received, the Control Server 140 preferably determines whether the message is a start record 315 event, audio data 320, visual data 325, or a stop record 330 event. The Control Server 140, in an example embodiment, subsequently processes each message depending on its type. For example, each message received by the Control Server 140 is written into an event log to record the message type and the time the message was received, as shown in steps 335, 340, 345, and 350.

In a preferred embodiment, a start record 315 event causes the Control Server 140 to begin recording the session. For example, upon receiving the start record 315 event, the Control Server 140 writes an entry into the event log and then the Control Server 140 opens a temporary file, as shown in step 355. This temporary file is used to store the visual data elements that are being recorded for the session.

Preferably, when the Control Server 140 is recording, an audio data 320 event is recorded by the Control Server 140 in a separate audio file. For example, when an audio event is passed to the Control Server 140, the Control Server 140 writes an entry into the event log and then stores the audio element in a separate, unique file, as illustrated in steps 360 and 365. Alternatively, the Control Server 140 could store all of the audio events in the same file. In one embodiment, the Control Server 140 might store all of the audio and visual data elements in the same file. In a preferred embodiment, when the Control Server 140 is not recording the collaborative Web browsing session 100, audio data events are passed directly along to the Attendee Clients 120, as indicated by step 360.

In a preferred embodiment, when the Control Server 140 is recording, visual data 325 events are written to a temporary file as shown in step 380. For example, when the Control Server 140 receives a visual data event while recording is in progress, the Control Server 140 first writes an entry into the event log and then writes the visual data element to the temporary data file opened up in step 355. In the same example, when the Control Server 140 is not recording, visual data 325 events are set along to the Attendee Clients 120 as portrayed in step 385.

Preferably, a stop record 330 event causes the Control Server 140 to end the recording session. For example, in step 390, upon receipt of the stop recording message and after writing an entry into the event log, the Control Server 140 waits until it has received all of the audio messages contained in the session being recorded. Once the Control Server 140 has all of the audio elements, the Control Server 140 merges all of the separate audio files into a single audio file as illustrated in step 395.

In a preferred embodiment, the merging process takes place after the Presenter Client 110 has sent the stop record message to the Control Server 140. FIG. 4 is a flowchart depicting an example of a merging process that can be used by the Control Server 140 to integrate the audio and visual data elements that comprise the recorded collaborative Web browsing session 100.

In a preferred embodiment, the initial step for merging the audio and visual data elements is the opening and reading of the event log. For example, in step 400, the Control Server 140 opens the event log file and subsequently in step 410, the Control Server 140 retrieves an entry from the same event log. Continuing the example, the Control Server 140 continues to retrieve entries from the event log until the start record 315 event is found, as illustrated in step 415. During this time, the Control Server 140 is building the initial state information as depicted in step 420. In a preferred embodiment, the state information recreates the look and feel of the Presenter Client's 110 computer immediately prior to the start of the recorded collaborative Web browsing session 100.

In an alternative embodiment, there can be more than one Presenter Client 110 recording a collaborative Web browsing session 100. In such a case, the Control Server 140 would necessarily be required to verify that the encountered start record 315 event is the correct stat record 315 event. Once verified, the Control Server proceeds to create the playback file. For example, when the Presenter Client 110 is recording the session and a Co-Presenter Client 160 is also recording the session, there would be two start record 315 messages in the event log.

Preferably, when the correct start record 315 event has been encountered and the initial state has been established, the Control Server 140 creates the archive file. For example, as shown in step 425, the Control Server 140 creates a playback file to contain all of the audio and visual data events comprising the collaborative Web browsing session 100. Alternatively, audio events and log entries of the visual data events can be stored in a first archive file while the visual data corresponding to the log entries is stored in a second, corresponding archive file. In the present example, illustrated in step 430, the first entries written in the playback file by the Control Server 140 set up the initial state for the Playback Client's 150 browser.

Next, the Control Server 140 opens up the temporary audio file in step 435 and starts reading audio events from that file. In a preferred embodiment, the audio data 320 elements are read in ½ second increments. For example, the Control Server 140 reads ½ second of audio from the temporary audio file and then writes that audio data into the archive file, as illustrated in step 445. At this point, the Control Server 140 preferably consults the event log to see if any events from the log took place during the ½ second period covered by the audio data previously written to the archive file. For example, in step 450, the Control Server 140 retrieves the next entry from the event log and compares its timestamp to that of the previously written audio element in step 455. Alternatively, the Control Server 140 could construct the timestamp based on a formula such as: ½ seconds*[the number of increments processed]+[time of the start record 315 event]. If the entry from the event log took place during the ½ second of audio, then the Control Server 140 writes that entry into the archive file for contemporaneous execution with the ½ second of audio.

In a preferred embodiment, the Control Server 140 determines if the event in the log file is of the type that must be handled by the Control Server 140. For example, if the Control Server 140 determines, in step 460, that the event in the log file is a Control Server 140 event, the Control Server 140 formats the event in Control Server 140 language in step 470, prior to writing that event into the archive file in step 475. Conversely, if the Control Server 140 determines that the event is not a Control Server 140 event, then the Control Server 140 formats the event Playback Client 150 language in step 465, prior to writing that event into the archive file in step 475.

In one embodiment, the Control Server 140 determines whether the event log entry took place within the previously read ½ second of audio. If the event did not take place within that ½ second, the Control Server 140 reads another ½ second of audio and writes that data element into the archive file. For example, if the next event from the event log was time stamped as taking place 5 seconds after the previously written audio data, the Control Server 140 would write 10 more audio data elements to the archive file before writing that event from the event log. In a preferred embodiment, when there are no more audio elements left, the archive file is closed and the merging process is complete. For example, once the Control Server 140 has read the last entry in the temporary audio file, the Control Server 140 checks to see if there is any audio data left. Because there is not, the Control Server 140 closes the archive file and does not attempt to add any additional elements from the event log. Preferably, when the audio elements are exhausted, the recorded collaborative Web browsing session 100 has ended.

In a preferred embodiment, the Playback Client 150 can select to view a number of previously recorded collaborative Web browsing session's 100. FIG. 5 is a flowchart depicting an example of a playback process that can be used by the Playback Client 150 to view a previously recorded collaborative Web browsing session 100. In a preferred embodiment, the Playback Client 150, accesses the Control Server 140 and the previously recorded collaborative Web browsing sessions 100 via the Web 130. For example, after browsing through the Web pages of the Control Server 140, the Playback Client 150 selects a particular collaborative Web browsing session 100 to replay.

In a preferred embodiment, the Playback Client 150 selects the session by clicking the mouse on an object representing that session. For example, in step 500 the Playback Client 150 begins the playback process by downloading an applet from the Control Server 140 computer. In a preferred embodiment, this applet starts to run on the Playback Client 150 computer and causes the Playback Client's 150 Web browser to relinquish control to the Control Server 140. For example, in step 510 when the applet begins to run on the Playback Client's 150 computer, the name of the archive file is known to the applet. Thus, in step 520, the applet requests the particular archive file from the Control Server 140 for playback. Continuing the example, after the applet has requested the playback file from the Control Server 140, in step 530 the applet resets the features of the Playback Client 150 browser.

In one embodiment, the Playback Client 150 applet receives the archived session data from the Control Server 140 and processes that data. For example, in step 540, the Playback Client 150 reads the incoming data from the Control Server 140. Next, in step 550, the Playback Client 150 applet determines if it has received an audio event. If an audio event is encountered, the applet plays the audio as demonstrated in step 560. Alternatively, in step 570, if the data is not an audio event, the applet determines if the data represents a server event. If the Control Server 140 needs to process the data, as illustrated in step 580, the data is sent back to the Control Server 140 for the appropriate processing. if the data does not represent a server event, the applet handles the event locally for the Playback Client 150, as illustrated in step 590.

In a preferred embodiment, after the element of archive data to be replayed has been processed, the Playback Client 150 repeats the process. For example, once the archived data has been sorted as an audio event, a server event, or a local event, the Playback Client 150 applet processes that data and then retrieves the next element of archived data from the Control Server 140. In one embodiment, the applet will receive all of the archived data from the Control Server 140 and process that data such that the Playback Client 150 views the previously recorded collaborative Web browsing session 100 as if attending the original session.

In alternative embodiments, the events comprising the session can be streamed to the Playback Client 150 as they are red by the Control Server 140 or the events comprising the session can be read in their entirety and sent to the Playback Client 150 in one large transmission. Preferably, the data is immediately processed by the Control Server 140 and sent to the Playback Client 150 as it is processed by the Control Server 140. However, the Control Server 140 may alternatively employ, for example, a checksum feature that reads the entire archive file and verifies the integrity of the whole before sending any data events to the Playback Client 150.

In one embodiment, the entire merging process takes place each time a session is requested for playback by the Playback Client 150. For example, the data comprising the session is stored in multiple files, one for audio data, one for visual data, and one for the chronological log of events comprising the session. Each time that a particular session is requested for playback, the Control Server 140 reads in the audio data file, the visual data file and the corresponding events from the log file. As the Control Server 140 chronologically merges the audio, visual, and other events together, those events are sent to the Playback Client 150. Thus, in this example, each time the session is replayed, the merging process is repeated.

FIG. 6 depicts an example of a control window that allows the Presenter Client 110 to select the name of the archive filename. Additionally, this example illustrates a method that allows the Presenter Client 110 to start the recording session, as discussed above with reference to step 315.

While the particular record and playback of a collaborative Web browsing session herein shown and described in detail is fully capable of attaining the above described objects of this invention, it is to be understood that the description and drawings represent the presently preferred embodiment of the invention and are, as such, a representative of the subject matter which is broadly contemplated by the present invention. It is further understood that the scope of the present invention fully encompasses other embodiments that may become obvious to those skilled in the art, and that the scope of the present invention is accordingly limited by nothing other than the appended claims.

What is claimed is:

1. A method comprising:
    causing a first computer to control a browser application of at least a second computer, thereby enabling a collaborative web browsing session with at least said second computer;
    receiving audio and visual data elements of said session from a computer participating in the collaborative web browsing session;
    storing said audio and visual data elements in a presentation file;
    receiving a selection request for said presentation file; and
    playing back said audio and visual data elements of said presentation file.

2. The method of claim 1 wherein the audio and visual data elements are stored separately and later merged into a presentation file.

3. The method of claim 1 wherein the visual data elements include images dynamically integrated into the collaborative web browsing session.

4. A computer system comprising
    a session module configured to cause a first computer to control a browser application of at least a second computer, thereby enabling a collaborative web browsing session with at least said second computer;
    a receiver configured receive audio and visual data elements of said session from a computer participating in the collaborative web browsing session;
    an archiver configured to store said audio and visual data elements in a presentation file;
    a selection receiver configured to receive a request for said presentation file a computer; and
    a transmission module configured to transmit said presentation file to said requesting computer for playback.

5. The system of claim 4 wherein the session module is installed on said first computer.

6. The system of claim 4 wherein said archiver stores the audio and visual elements separately.

7. The system of claim 6, wherein the archiver further comprises a merger configured to merge the audio and visual events into the presentation file.

8. The system of claim 4, wherein the collaborative we browsing session occurs over Internet.

* * * * *